Oct. 25, 1932.  H. J. PETERSON ET AL  1,884,197
SELF INSTRUCTOR AND TESTER
Filed Nov. 13, 1930   3 Sheets-Sheet 1

Fig. 1.

1 Emeralds are ( red  green  blue  yellow)

2 Polyps are ( animals  plants  stones  metals)

3 Air ( rises  falls) in the center of a cyclone

4 Dry air feels ( colder  warmer) than it is at 80 degrees F

5 Humid air feels ( colder  warmer) than it is at 40 degrees F

Fig. 2.

1 Emeralds are ( red  green  blue  yellow)

2 Polyps are ( animals  plants  stones  metals)

3 Air ( rises  falls) in the center of a cyclone

4 Dry air feels ( colder  warmer) than it is at 80 degrees F

Fig. 3.

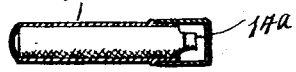

Inventors
H.J.Peterson, J.C.Peterson,
By
Attorney

Oct. 25, 1932.   H. J. PETERSON ET AL   1,884,197
SELF INSTRUCTOR AND TESTER
Filed Nov. 13, 1930    3 Sheets-Sheet 2

Inventors
H. J. Peterson, J. C. Peterson.

By L. F. Randolph Jr.
Attorney

Fig. 3.

Patented Oct. 25, 1932

1,884,197

UNITED STATES PATENT OFFICE

HANS J. PETERSON, OF HATTIESBURG, MISSISSIPPI, AND JOHN C. PETERSON, OF MANHATTAN, KANSAS

SELF-INSTRUCTOR AND TESTER

Application filed November 13, 1930. Serial No. 495,430.

This invention relates to a self-instructor or tester which may for example be used by students or other persons taught, tested or examined.

An important object is to provide a device of this character along the general lines of that disclosed in our pending application Serial Number 454,728, filed May 22, 1930, which is particularly adapted to record by chemical means or by chemical and mechanical means combined the responses of a student or person taught, tested or examined in such a manner as to indicate to him immediately or after a short interval the correctness or incorrectness of each response.

Another object is to facilitate the process of scoring or grading the responses of anyone who is being taught, tested or examined.

A further object is to disclose the correct response to a question or problem when no alternative responses are listed.

An additional object is to direct and stimulate the attention and interest of readers in their perusal of printed matter used for advertising or promulgation.

Various additional objects and advantages will become apparent from a consideration of the description following taken in connection with accompanying drawings illustrating an operative embodiment.

In said drawings:—

Figure 4:
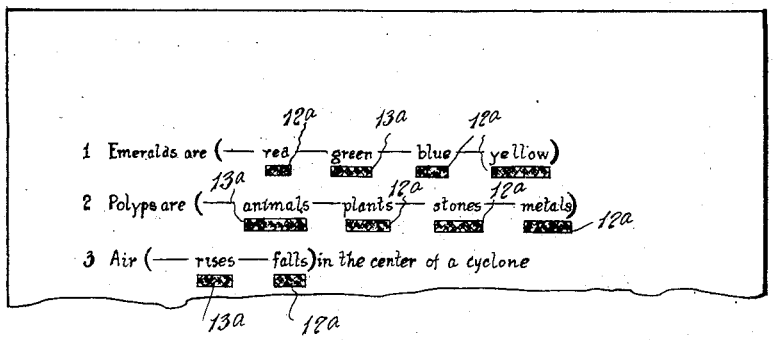
Figure 5:
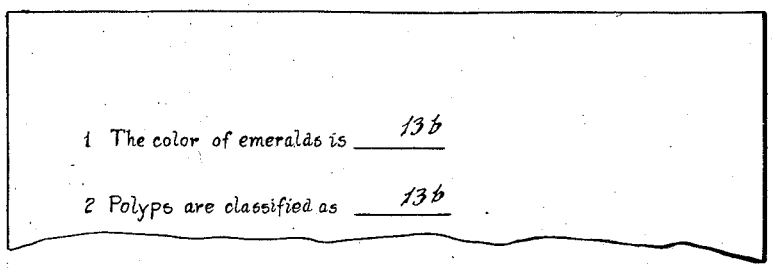
Figure 6:
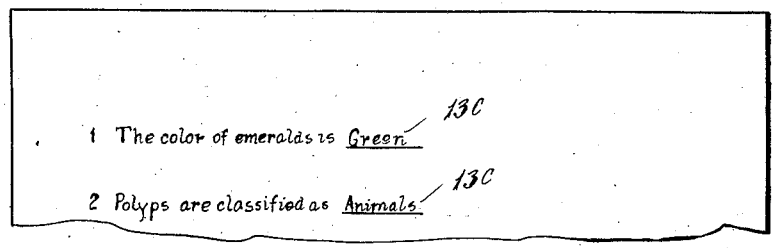
Figure 7:
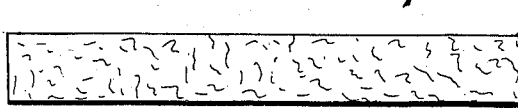
Figure 3:
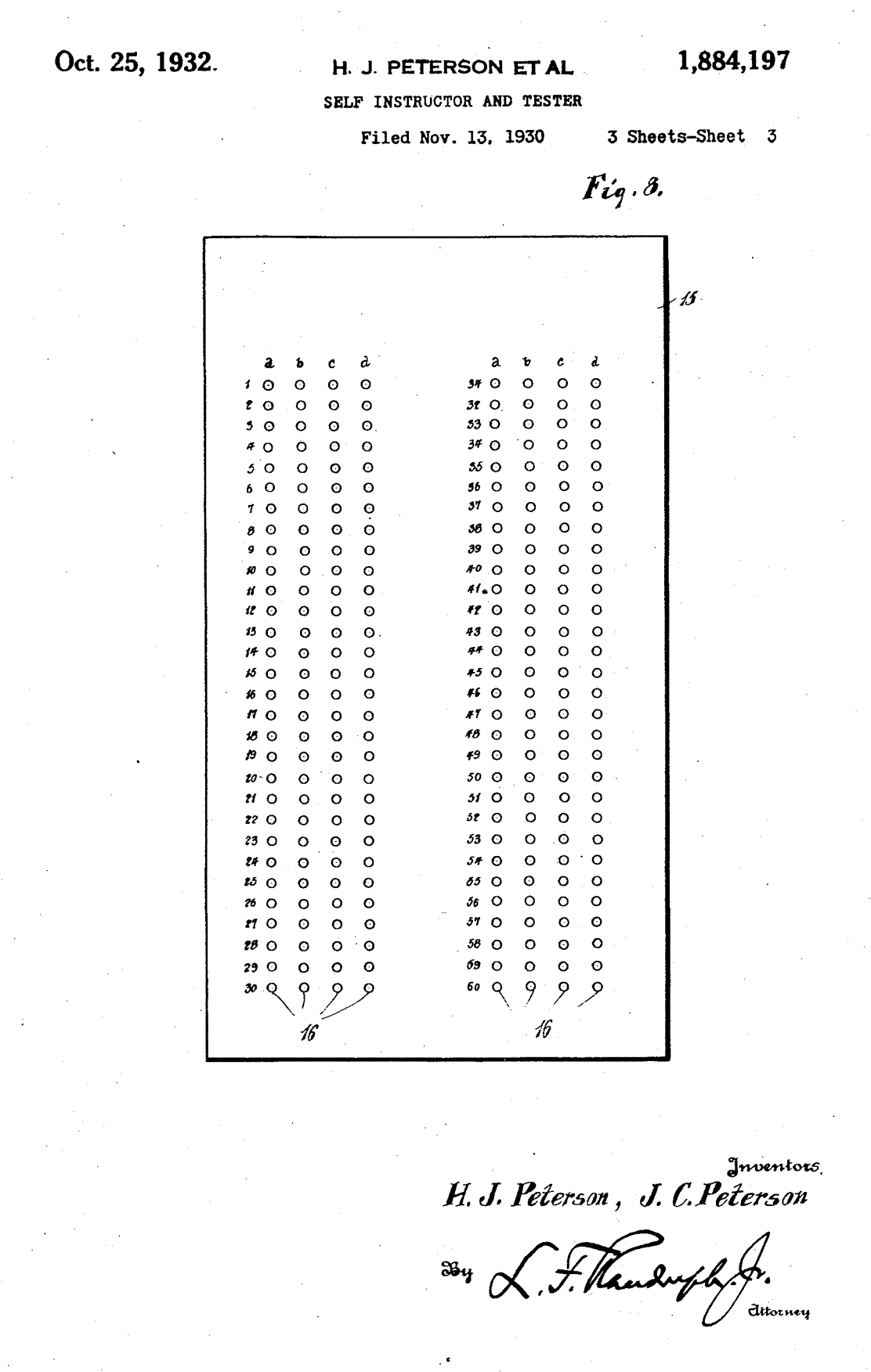

Figure 1 is a plan view of a sheet or the like embodying one example of the invention, Figure 2 is a view similar to Figure 1 but showing the sheet after use, Figure 3 is a detail longitudinal section through a case carrying one of the chemical carriers or tubes, Figure 4 is a view of a modified form, Figure 5 is a view of a further modified form, Figure 6 is a view showing the form of Figure 5 after use, Figure 7 is a detail of the reagent carrying strip, and Figure 8 is a plan view of another modified form.

Referring first to the form of the invention shown in Figures 1 and 2, questions according to the examination, lesson or test, are contained as at 10 on a sheet or sheets 11 of paper or the equivalent. At the end or adjacent each question a plurality of spots or zones 12 and 13 are provided. The answer to the first question given being green, the dot or spot 13 should finally appear in a different color or gray value from those of the dots or spots 12 for the incorrect answers. All of the spots 12 may be of the same color but a different color from the spots 13 when reacted upon by the solution of another chemical or mixture of chemicals or with water or heat. For example, as shown in Figure 3, a tube 14 having a filling of absorbent material $14^a$ or a strip or indicator such as that shown in Figure 7, and designated $14^b$ is adapted to be impregnated with or to carry a solution of a chemical or mixture of chemicals or water which will react with the chemical at the spots 12 and 13, to convert them into different colors. Normally such spots 12 and 13 are initially of the same color.

The same system is followed in each of the examples, tests or questions given on the sheet, the dots 13 in each example being for the correct answer and the dots 12 for the incorrect answers.

In Figure 4, the same system is followed as in connection with Figures 1 and 2 and 7, the difference being that the dots or spots shown are rectangular instead of round and are designated at $12^a$ and $13^a$, corresponding exactly with those at 12 and 13 of the preceding figures.

Referring to Figures 5 and 6, the answers to the questions are initially invisible and when the indicator strip 14 containing a chemical or chemicals or water, is applied opposite the spaces $13^b$, the material thereon of the same material as at 13 and $13^a$ will provide the correct answer in a word or words as shown at $13^c$ in Figure 6. This form enables a student to answer the question in pencil or otherwise on the same sheet or on a separate sheet, and later to develop the material to compare the correct answer with his answer.

A further modified form is shown in Figure 8 in which a suitable sheet 15 is used having portions 16 arranged in vertical and horizontal rows, the same being numbered or lettered if desired, as shown. Portions 16 are treated with various chemicals, those to indicate the correct answer being of the same chemical as used at 13 for example and those to indicate the incorrect answer being of the chemical shown at 12, such chemicals being adapted for reaction with the chemical or chemicals or water carried by the indicator strip 14.

Separate chemicals or different degrees of concentration of the same chemicals may be used to differentiate correct from incorrect responses by diverse changes in their gray values or colors when brought into contact with another chemical. For example, the correct response may be indicated by its accompanying portion changing to red, bleaching out somewhat or disappearing and the incorrect responses by their accompanying portions changing to blue or being intensified upon contact with a solution of another chemical or mixture of chemicals or with water or heat, or vice versa.

Or, more simply, the correct responses may be treated as specified above but with an invisible chemical or mixture of chemicals and the incorrect responses may not be treated with any chemical at all, so that only the portions indicating correct responses will change in gray value or color upon contact with a solution of another chemical or mixture of chemicals or with water or heat. In this case said solution of another chemical or mixture of chemicals or water may be colored sufficiently to leave a visible mark on each portion of the tester surface brought into contact with it and thus record all incorrect responses without the reaction of a chemical indicator.

This "other" chemical or mixture of chemicals or water is conveyed to the portions of the tester surface indicating correct or incorrect alternative responses by means of a pin, a pen, a brush, a sponge or any other convenient instrument, hence the indicators 14 and 14ª and 14ᵇ are to be taken merely as examples.

The student, according to which he believes to be the correct answer will with any suitable instrument apply the required chamicals, heat or water to the small circle before the chosen answer. If the chosen answer is correct, the color of said circle will change to whatever color has been designated as an indicator of correctness of response. If the chosen answer is incorrect, the color of said circle will change to whatever color has been designated as an indicator of incorrectness of response.

These changes in color may be changes in either brightness, hue or saturation or any combination of such changes. Said changes may involve the entire obliteration of the characters upon which the chemical action takes effect as when the brightness of a gray or white figure is reduced to match a darker neutral background or the brightness or saturation or hue of any color is reduced or enhanced to match either a neutral or a colored background. Or the changes mentioned above may involve the production of contrasting effects or brightness or of hue or saturation as when portions hitherto indistinguishable from their background are reduced or enhanced in brightness, hue or saturation until they become visibly different from their background.

The same identical change may signify correctness of response in one exercise and incorrectness in another according to the oral or printed specifications and directions given with each exercise.

Obviously these chemical indicators of correct or incorrect responses may be printed directly on any set of questions, problems or exercises as in a book, pamphlet, a leaflet or printed sheet or they may be printed on a sheet separate and distinct from that on which the questions or problems appear. The more direct method of printing the chemical indicators of correct and incorrect responses on the surface containing the questions, problems or exercises will be more serviceable for use with standardized tests or exercises and, because of its simplicity, with younger learners and in advertising. The less direct method of printing the chemical indicators of correct and incorrect responses on a separate sheet at points and by numerals and letters corresponding to individual items of lists of questions, problems or exercises, will be more serviceable for use with tests and exercises written for small groups of learners who are sufficiently advanced mentally to recognize comparable elements in the exercises and test sheets respectively.

Instead of using the reagent on the strip 14, each of the spots or areas 12 and 13 and the others to indicate correct and incorrect responses, may be adapted to change color and a different color from each other, upon the application of heat thereto, such dots or spots initially being alike in color. Obviously the chemically treated portions of the tester surface heretofore mentioned as dots, spots, zones, circles, rectangular areas etc. may be of any convenient size or form and in any convenient position so that those terms and the drawings designated by them are to be taken merely as examples.

As example hereinafter referred to as number 1, portions of the tester surface representing correct answers as at 13 may be indicated by means of a mixture consisting of about equal parts of yellow water-color printer's ink (e. g., planograph ink No. 11) and a saturated solution of phenolsulphonephthalein in alcohol. Portions representing incorrect answers may be indicated by means of the ink alone plus a small amount of red or orange water-color printer's ink to match its color with that of the first mentioned mixture.

An alkali solution of moderate strength (e. g., bicarbonate of soda) as on indicator 14 applied to the chemically treated portions quickly changes the color of those representing correct response to orange-red.

In said Example 1, less of the saturated solution of phenolsulphonephthalein may be added to a given quantity of printer's ink if desired.

As a third example portions of the tester surface representing correct responses may be indicated as stated above under Example 1. Portions representing incorrect responses may be indicated by means of a mixture consisting of about equal parts of ink (e. g., planograph ink No. 11) and a saturated solution of dibromthymolsulphonephthalein in alcohol, matched in color with the mixture representing correct responses by the addition to it of an appropriate amount of red or orange water-color printer's ink to the mixture representing either correct or incorrect responses or both. Spots so treated will change color when brought into contact with a solution of alkali of moderate strength.

Essentially the same results may be obtained by the use of moisture-sensitive printing inks. For example, moisture sensitive blue (listed by the International Printing Ink Corporation as moisture sensitive blue= XX703) may be mixed with red printing ink so as to produce a purple printing ink which will turn blue upon contact with moisture. Likewise moisture sensitive red (listed by International Printing Ink Corporation as moisture sensitive red=XX702) may be mixed with blue printing ink so as to produce a purple ink identical in appearance with the purple obtained by the preceding mixture. But this latter mixture will turn red upon contact with moisture. Other colors of these moisture sensitive inks are now available from the same distributors.

Being more convenient for the reader or learner these moisture sensitive inks are obviously preferable for some uses as for example magazine advertising whereas the chemical indicators mentioned above in Examples 1 to 3 are preferable for use wherever the tester surface may be unintentionally exposed to moisture as in newspaper advertising or publicity.

One may also print with any one of the foregoing chemicals or mixtures of chemicals on paper of the color to which the chemical turns when brought into contact with the proper chemical in solution. Contact with such solution will then render the printed characters invisible.

Again cobalt may be boiled in acetic acid. Divide into two equal parts. To one part add a little common salt and with this solution treat those portions of the tester device which represent wrong responses. To the other part add a little niter and with this solution treat those portions of the tester device which represent correct responses. Heating will then change to green those portions which represent incorrect answers and to pale rose those portions which represent correct answers.

Various changes may be resorted to provided they fall within the spirit and scope of the invention.

We claim as our invention:—

1. A tester device comprising means having segregated portions thereof provided with respectively different inks, one of said portions being capable of development so that the device may be used to indicate a correct or an incorrect response.

2. A tester device comprising means having segregated portions provided with respectively different visible chemicals, said chemicals being normally similar in appearance and one being capable of development to a different appearance, whereby the device may be used to indicate a correct or an incorrect response.

3. A tester device comprising means having segregated portions provided with respectively different invisible chemicals thereon, each of the chemicals being capable of development to present a different appearance from any other, whereby the device may be used to indicate a correct or an incorrect response.

4. A tester device comprising means having portions provided with a chemical giving a certain appearance and other portions not provided with a chemical and having a similar appearance, the said chemical being capable of development to present a different appearance, whereby the device may be used to indicate a correct or an incorrect response.

5. A tester device comprising means having portions provided with a chemical giving a certain appearance and other portions not provided with a chemical and having a similar appearance, the said chemical being capable of development to present a different appearance, and extraneous means capable of leaving a mark of its own upon an engaged portion and at the same time capable of developing a portion having said chemical to a different appearance from the self-mark of said means left on a portion not having a chemical, whereby each contact of said extraneous means with any portion is recorded thereon.

6. A tester device comprising means having segregated areas with different concentrations of a chemical thereon, said areas being capable of development into visible areas of correspondingly different intensities, whereby the device may be used to indicate a correct or an incorrect response.

7. A tester device comprising means having segregated areas one or more of the same being provided with a chemical capable of development and one or more thereof being not so provided.

8. A tester device comprising means having segregated areas defined by material which is inherently capable of development, one or more of such areas developing to a certain appearance, and one or more of the other areas developing to a certain different appearance, whereby the device may be used to indicate a correct or an incorrect response.

9. A tester device comprising means having segregated areas defined by material which is inherently capable of development, one or more of such areas developing to a certain appearance, and one or more of the other areas developing to a certain different appearance, and all of said areas normally presenting a similar appearance, whereby the device may be used to indicate a correct or an incorrect response.

10. A tester device comprising means having segregated areas provided with respectively different chemicals, said areas being capable of development into visible areas of correspondingly different colors when brought into contact with a testing means differing in character from said chemicals, whereby the device may be used to indicate a correct or an incorrect response.

11. A tester device comprising means having certain indicated portions provided with invisibly recorded characters and other indicated portions of similar appearance provided with different invisibly recorded characters, the said invisible characters being capable of development whereby the device may be used to indicate a correct or an incorrect response.

12. A tester device comprising means having certain indicated portions provided with invisibly recorded characters and other indicated portions of similar appearance not provided with such characters, the said invisible characters being capable of development whereby the device may be used to indicate a correct or an incorrect response.

13. A tester device comprising means having certain indicated portions provided with invisibly recorded characters and other indicated portions of similar appearance not provided with such characters, the said invisible characters being capable of development, and extraneous means capable of developing said characters and at the same time of recording upon an engaged portion a distinctive mark of its own, whereby the device may be used to indicate a correct or an incorrect response.

14. A tester device comprising means bearing visible questions and having areas with the respective correct answers thereto printed in invisible ink capable of development, said means having blank spaces in which a person may inscribe a proposed answer before developing the invisible correct ones.

15. A tester device comprising means having indicated portions provided with a chemical giving a certain appearance and other indicated portions provided with a different chemical giving a similar appearance, one of said chemicals being capable of development to a different appearance and the other being capable of reacting to an extrinsic agent by disappearing when engaged by said agent, whereby the device may be used to indicate a correct or an incorrect response.

16. A tester device comprising means having indicated portions provided with a chemical giving a certain appearance and other indicated portions of similar appearance but not provided with the aforesaid chemical, and extraneous means capable of leaving a mark of its own upon an engaged portion and at the same time of reacting with said chemical causing it to disappear, whereby the device may be used to indicate a correct or an incorrect response.

17. A tester device comprising means the material of which is inherently capable of development to a certain appearance said device having indicated areas one or more of which are provided with a chemical capable of development to a different appearance all of said areas normally presenting a similar initial appearance, whereby the device may be used to indicate a correct or an incorrect response.

HANS J. PETERSON.
JOHN C. PETERSON.